UNITED STATES PATENT OFFICE.

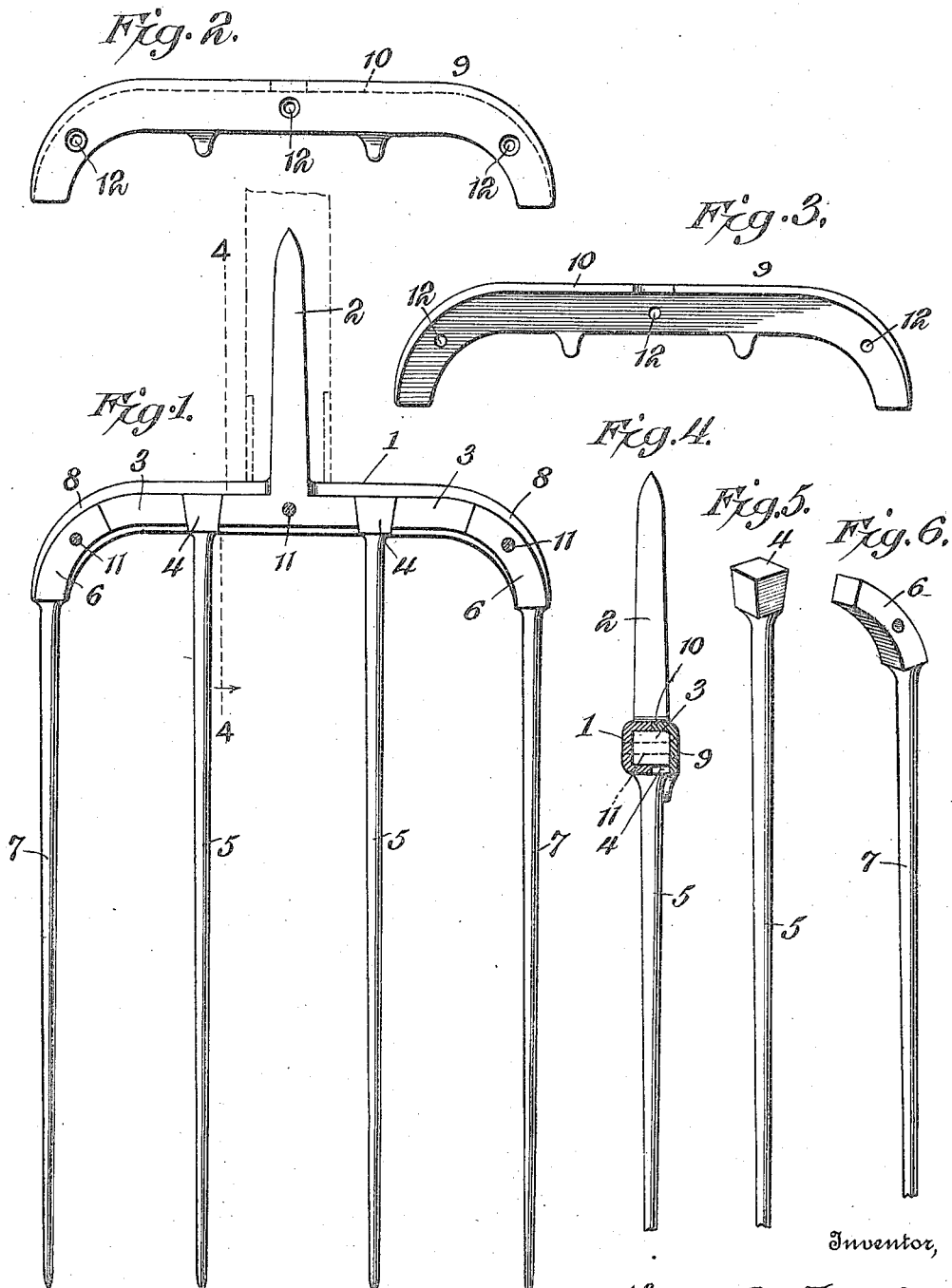

HENRY C. FUNK, OF GRANT TOWNSHIP, RILEY COUNTY, KANSAS.

REMOVABLE-TINE PITCHFORK.

1,233,337.　　　　Specification of Letters Patent.　　Patented July 17, 1917.

Application filed April 4, 1917. Serial No. 159,676.

*To all whom it may concern:*

Be it remembered that I, HENRY C. FUNK, a citizen of the United States, residing in Grant Township, in the county of Riley and State of Kansas, have invented certain new and useful Improvements in Removable-Tine Pitchforks, of which the following is a specification, reference being had to the accompanying drawings, which form a part hereof.

My invention relates to improvements in pitchforks and the objects are to provide a fork in which the tines may be separately removed and replaced by other tines, particularly for the purpose of renewing the fork when one or more tines become broken or otherwise defective. Also to provide such a fork of simple and substantial construction.

I attain these objects by means of the construction hereinafter described and illustrated in the accompanying drawings, in which,—

Figure 1 is a view of a front elevation of my invention with the face-plate removed;

Fig. 2, a view of the face-plate;

Fig. 3, a view of the reverse or inside of the face-plate;

Fig. 4, a cross sectional view of the invention on the line 4—4 of Fig. 1;

Fig. 5, a separate view of one of the middle tines and

Fig. 6, a separate view of an outer tine.

Similar numerals of reference indicate like parts throughout the several views.

For convenience of construction the fork head 1, tang 2 and ribs 3 are made in one solid piece. In rib 3, at intervals the proposed distance between the tines, dovetail sockets are provided for reception of the dovetailed heads 4 of the tines 5. The heads 6 of the two outer tines 7 curve to conform to the curve of the shoulders 8 and the sockets provided for their reception in the ends of rib 3. A face-plate 9 is provided for covering the heads of the tines with its flange 10 projecting over the top of rib 3. The whole is secured together by means of screws or rivets through holes 11 and 12.

To remove a tine, face-plate 9 is detached by removing the screws or rivets. The tine may then be easily lifted out of its respective socket, another substituted therefor and the face-plate replaced.

One of the advantages of my improvements is the ready removal of a broken or defective tine and replacement thereof by a new or perfect tine, thus avoiding the necessity of throwing away the otherwise useless fork.

Having thus described my invention what I claim as new and desire to secure by Letters Patent is,—

A tool of the class described comprising a head, dovetail sockets in said head, a plurality of tines provided with dovetailed heads fitted to said sockets, a face-plate overlapping said tine heads and secured to the fork head for the purpose of retaining said tines in position and means for attaching a handle to such tool.

HENRY C. FUNK.

Witnesses:
　Jos. W. WILSON,
　BESS L. AUCHARD.

Copies of this patent may be obtained for five cents each, by addressing the "Commissioner of Patents, Washington, D. C."